US007630015B2

(12) United States Patent
Okamura

(10) Patent No.: US 7,630,015 B2
(45) Date of Patent: Dec. 8, 2009

(54) LIGHT EMISSION CONTROL METHOD OF FLASH DEVICE, LIGHT EMISSION CONTROL PROGRAM, AND IMAGE SENSING APPARATUS

(75) Inventor: Satoshi Okamura, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 766 days.

(21) Appl. No.: 11/059,618

(22) Filed: Feb. 15, 2005

(65) Prior Publication Data
US 2005/0179810 A1 Aug. 18, 2005

(30) Foreign Application Priority Data
Feb. 17, 2004 (JP) .............................. 2004-039802

(51) Int. Cl.
H04N 5/222 (2006.01)
H04N 5/235 (2006.01)
(52) U.S. Cl. ...................................... 348/371; 348/362
(58) Field of Classification Search ................. 348/362, 348/370, 371, 317, 373, 207.1, 333.05, 203, 348/246
See application file for complete search history.

(56) References Cited

U.S. PATENT DOCUMENTS

| 6,067,422 | A | 5/2000 | Tokunaga et al. | |
|---|---|---|---|---|
| 6,272,292 | B1 * | 8/2001 | Iwasaki et al. | 396/157 |
| 6,654,062 | B1 * | 11/2003 | Numata et al. | 348/362 |
| 6,657,667 | B1 * | 12/2003 | Anderson | 348/333.12 |
| 6,801,716 | B2 * | 10/2004 | Takeuchi | 396/61 |
| 7,365,780 | B1 * | 4/2008 | Miyazaki | 348/231.6 |
| 7,414,666 | B2 * | 8/2008 | Yamaguchi | 348/371 |
| 2001/0019364 | A1 * | 9/2001 | Kawahara | 348/362 |
| 2002/0197707 | A1 * | 12/2002 | Falla et al. | 435/271 |
| 2004/0145674 | A1 * | 7/2004 | Hoppe et al. | 348/371 |
| 2004/0170420 | A1 * | 9/2004 | Fukui | 396/157 |

FOREIGN PATENT DOCUMENTS

JP 2002-287201 2/2001

OTHER PUBLICATIONS

Chinese Office Actilon dated Nov. 23, 2007 concerning Chinese Patent Application 2005100083804.

* cited by examiner

Primary Examiner—Nhan T Tran
Assistant Examiner—Trung Diep
(74) Attorney, Agent, or Firm—Cowan, Lieberman & Latman, P.C.

(57) ABSTRACT

When a flash device is to be controlled in synchronism with continuous image photography, this flash device is controlled so that the interval of continuous image photography is shortened, and that a correct exposure state is obtained even if continuous photography is performed under conditions by which the exposure state changes momentarily, such as when a moving object is to be photographed. To this end, in a continuous photographing mode in which a plurality of images are continuously captured at predetermined intervals (S101), the light emission amount of the flash device is determined from the reflected light amount of light emitted beforehand when the first image is to be captured (S102-S105, S107). When the nth (n>1) image is to be captured, the light emission amount is determined by using the reflected light amount of the flash device which emits light when the (n−1)th image is captured (S106).

6 Claims, 8 Drawing Sheets

-- Prior Art --

-- Prior Art --

-- Prior Art --

LIGHT EMISSION CONTROL METHOD OF FLASH DEVICE, LIGHT EMISSION CONTROL PROGRAM, AND IMAGE SENSING APPARATUS

FIELD OF THE INVENTION

The present invention relates to a technique which controls the light emission of a flash device of an image sensing apparatus which contains the flash device or to which the flash device can be attached.

BACKGROUND OF THE INVENTION

Recently, a digital still camera generally photographs a correctly exposed still image under low illuminance by controlling a flash device (strobe) which is contained in or externally connectable to the camera. As a control method of this flash device, a flash device control method which emits a known amount of light in advance and determines the light emission amount of photography from the reflected light amount of the emitted light is proposed.

Techniques which continuously photograph and record still images are also known. Examples are a continuous photographing function which continuously captures and records still images at predetermined intervals, and a multi-frame photographing function by which, as shown in FIG. 5, still images continuously captured at predetermined intervals are arranged in a time-series manner, and recorded as one still image.

As disclosed in U.S. Pat. No. 6,067,422, therefore, correctly exposed still images can be continuously photographed and recorded even under low illuminance by controlling the light emission of the flash device in synchronism with this continuous photography of the still images.

FIG. 4 is a block diagram showing a digital still camera which has a still image continuous photographing function and controls a flash device in synchronism with continuous photography. The arrangement of this digital still camera will be explained below.

Light entering the digital still camera is photoelectrically converted by an image sensor 403 through an image forming lens 401 and a stop 402 which controls the incident light amount. The image sensor 403 outputs a signal when driven by an image sensor driver 404 which controls the charge read time and charge storage time. A sample-and-hold circuit 405 samples and holds the output signal from the image sensor 403. A variable gain circuit 406 changes the gain of the output signal from the sample-and-hold circuit 405. A stop controller 407 controls the stop 402.

An image signal processor 408 generates an image signal made up of a luminance signal and color signal from the output signal of the variable gain circuit, generates a photometric value from the result of integration of the luminance signal, and outputs these image signal and photometric value. A read/write memory device 409 temporarily stores the output image signal from the image signal processor 408.

Reference numeral 412 denotes a flash device; and 411, a flash device controller which controls the flash device 412.

The output image signal from the image signal processor 408 is output to a still image recording circuit 414 where the image signal is converted into still image information. A still image recorder 415 records the still image information converted by the still image recording circuit 414.

A switch 413 is used to execute continuous photography. When the switch 413 is operated, still image continuous photography/recording start request information is output to a system controller 410. The switch 403 may also be used as an operating member for starting photography in each of a continuous photography execute mode and single-shot photography execute mode which can be switched. It is also possible to execute single-shot photography or continuous photography in accordance with the operation time of the switch 413.

The system controller 410 controls the system of the digital still camera. In order to give a predetermined level to the output photometric value from the image signal processor 408, the system controller 410 outputs control information to the stop controller 407, image sensor driver 404, and variable gain circuit 406, thereby controlling the aperture of the stop 402, the exposure time, and the gain of the output signal from the image sensor. The system controller 410 also controls continuous photography and the light emission of the flash device.

Continuous photography will be explained below.

When continuous photography start request information is obtained from the switch 413, the system controller 410 outputs to the image processor 408 an instruction to capture a predetermined number of still images at predetermined intervals. In synchronism with this still image capture instruction from the system controller 410, the image signal processor 408 writes the captured image signals in the memory device 409. When the capturing of the predetermined number of still images is complete, the image signal processor 408 sequentially reads out the still image signals stored in the memory device 409, and outputs the readout signals to the still image recording circuit 414. The still image recording circuit 414 records the input still image signals in the still image recorder 415, thereby completing continuous photography.

Control of the flash device will be described below.

When still image photography is to be performed using the flash device 412, the system controller 410 causes the flash device 412 to emit light in a known emission amount before still image photography is performed (this light emission will be referred to as "preemission" hereinafter), and outputs control information of this light emission to the flash device controller 411. The system controller 410 acquires the reflected light amount during this preemission as a photometric value from the image signal processor 408. On the basis of this photometric value during the preemission and a photometric value obtained before the preemission, the system controller 410 determines a light emission amount which gives a predetermined level to a photometric value during light emission (to be referred to as "main emission" hereinafter) which is performed in synchronism with still image photography.

The control of continuous photography and the control of the flash device are independent of each other. Therefore, the flash device can emit light in synchronism with continuous photography. This makes it possible to obtain correctly exposed images even when continuous photography is performed under low illuminance.

The processing performed by the system controller when the flash device is to be controlled in synchronism with continuous photography in the prior art will be described below with reference to a flowchart shown in FIG. 3.

In step S301 of FIG. 3, the system controller determines whether the continuous photography start switch is operated to generate a continuous photography start request. If the request is generated, the flow advances to step S302.

In step S302, the system controller initializes number-of-captured-image information indicating the number of captured still images, and acquires a photometric value before preemission. Then, the system controller determines the light emission amount of preemission in accordance with the brightness of an object, and the flow advances to step S303.

In step S303, the system controller outputs the light emission information of preemission to the flash device controller, and the flash device controller controls the flash device to perform preemission at a predetermined timing on the basis of the indicated light emission information. When the flash device completes the preemission, the flow advances to step. S304.

In step S304, the system controller acquires a photometric value during the preemission from the image signal processor, and the flow advances to step S305.

In step S305, from the photometric value before the preemission and the photometric value during the preemission, the system controller determines the light emission amount of main emission such that a photometric value during main emission has a predetermined level. After that, the flow advances to step S306.

In step S306, the system controller outputs the light emission information of main emission to the flash device controller, and the flash device controller controls the flash device to perform main emission in synchronism with still image capturing. When the flash device completes this main emission, the flow advances to step S307.

In step S307, the system controller writes still images captured by the image signal processor into the memory device, outputs an instruction to perform a still image capturing operation, and updates the number-of-captured-image information. Then, the flow advances to step S308.

In step S308, on the basis of the number-of-captured-image information, the system controller determines whether the number of captured still images has reached a predetermined number of images of continuous photography. If NO in step S308, the flow returns to step S302. If YES in step S308, the flow advances to step S309.

In step S309, the system controller reads out the still images stored in the memory device, and instructs the image signal processor to record the readout images in the still image recorder.

In the conventional flash device control method described above, whenever a still image is captured during continuous photography, the light emission amount of main emission is determined by executing preemission. As shown in FIG. 6, therefore, a time of five fields is necessary from arbitrary main emission to the next main emission. This makes it impossible to shorten the image capturing interval of continuous photography.

To solve this problem, as shown in FIG. 7, it is possible to execute preemission only before capturing of the first still image to determine the light emission amount of main emission in advance, and always perform main emission by the same light emission amount during continuous shooting. By this light emission control, the interval of continuous shooting can be reduced to three fields, shorter than that in the prior art.

This light emission control is more advantageous than the prior art in that the continuous photographing interval can be shortened. However, if the exposure state of a photographing frame changes during continuous photography because, e.g., an object or camera has moved, the exposure state of a photographed image cannot be maintained constant since the light emission amount of main emission is fixed.

SUMMARY OF THE INVENTION

The present invention has been made in consideration of the above situation, and is characterized by providing a technique which, when controlling a flash device in synchronism with continuous photography of images, shortens the interval of this continuous photography of images, and also controls the flash device to obtain a correct exposure state even when continuous photography is performed under conditions by which the exposure state changes momentarily, such as when a moving object is to be photographed. More specifically, during continuous photography by which a plurality of images are to be continuously captured, the light emission amount -is determined by using the reflected light amount of the flash device which emits light during capturing of an immediately preceding image, and an image is captured by causing the flash device to emit light by this light emission amount.

Note that the present invention is also applicable as a program for allowing a computer for controlling an image sensing apparatus to execute the light emission control method described above, or as a computer-readable recording medium storing the program.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

Note that embodiments to be described below are examples as preferred means for implementing the present invention, so the present invention is applicable to changes or modifications of the following embodiments without departing from the spirit and scope of the invention. In addition, the present invention is of course also achieved by supplying, to a system or apparatus, a storage medium (or recording medium) recording the program code of software which implements functions of image sensing apparatuses as embodiments (to be described below), and allowing a computer (or a CPU or MPU) of the system or apparatus to read out and execute the program code stored in the storage medium.

[First Embodiment]

The first embodiment according to the present invention is a flash device control method of a digital still camera which includes a continuous shooting function of continuously photographing and recording a predetermined number of still images at predetermined intervals, and controls a flash device in synchronism with this continuous photography. Control blocks of this digital still camera having the continuous photographing function are the same as the prior art shown in FIG. 4. The digital still camera may also include a motion image photographing function in addition to the still image continuous shooting function.

Processing performed by a system controller when the flash device is to be controlled in synchronism with still image continuous photography in the first embodiment will be described below with reference to a flowchart shown in FIG. 1.

Figure 1:
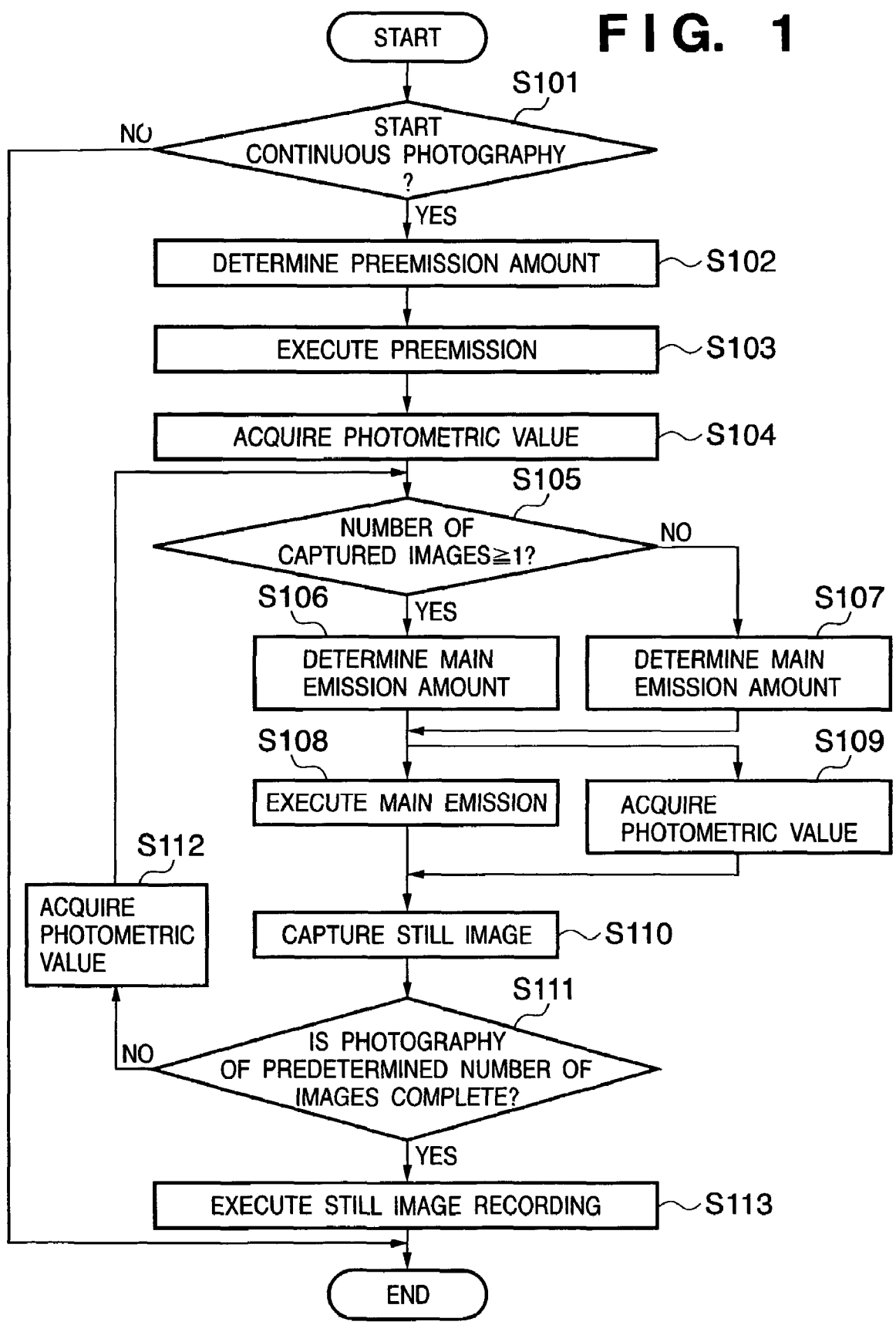
FIG. 1 is a flowchart showing flash device control of the first embodiment according to the present invention.

In step S101 of FIG. 1, the system controller determines whether a continuous photography start switch is operated to generate a continuous photography start request. If the request is generated, the flow advances to step S102.

In step S102, the system controller initializes number-of-captured-image information indicating the number of captured still images, and acquires a photometric value before preemission. Then, the system controller determines the light emission amount of preemission in accordance with the brightness of an object, and the flow advances to step S103.

In step S103, the system controller outputs the light emission amount information of preemission to a flash device controller, and the flash device controller controls the flash device to perform preemission at a predetermined timing on the basis of the indicated light emission amount information. When the flash device completes the preemission, the flow advances to step S104.

In step S104, the system controller acquires a photometric value during the preemission from an image signal processor, and the flow advances to step S105.

In step S105, the system controller determines from the number-of-captured-image information whether one or more still images are captured. If one or more still images are captured, the flow advances to step S106; if not, the flow advances to step S107.

In step S106, from a photometric value before the last main emission acquired in step S109 and a photometric value during the last main emission acquired in step S112, the system controller determines the light emission amount of main emission to be performed, such that a photometric value during this main emission has a predetermined level. After that, the flow advances to steps S108 and S109.

In step S107, from the photometric value before the preemission and the photometric value during the preemission, the system controller determines the light emission amount of main emission such that a photometric value during the main emission has a predetermined level. The flow then advances to steps S108 and S109.

In step S108, the system controller outputs the light emission amount information of main emission to the flash device controller. The flash device controller controls the flash device to emit light in synchronism with capturing of a still image. When the flash device completes main emission, the flow advances to step S110.

In step S109, the system controller acquires, from the image signal processor, the photometric value of a still image which is read while the main emission amount is determined in step S106 or S107, and the flow advances to step S110.

In step S110, the image signal processor writes, in a memory device, an image signal obtained at the timing synchronized with the main emission, and outputs an instruction to perform a still image capturing operation. Then, the system controller updates the number-of-captured-image information, and the flow advances to step S111.

In step S111, the system controller determines from the number-of-captured-image information whether the number of captured still images has reached a predetermined number of images of continuous photography. If NO in step S111, the flow advances to step S112. If YES in step S111, the flow advances to step S113. When the camera is so designed that still images are continuously captured while a switch 413 is being operated, the flow advances to step S112 if the operation of the switch 413 continues; if not, the flow advances to step S113.

In step S112, the system controller acquires, from the image signal processor, the photometric value during main emission captured in step S109, and the flow advances to step S105.

In step S113, the system controller instructs the image signal processor to read out the still images stored in the memory device and record them in a still image recorder.

Figure 6:
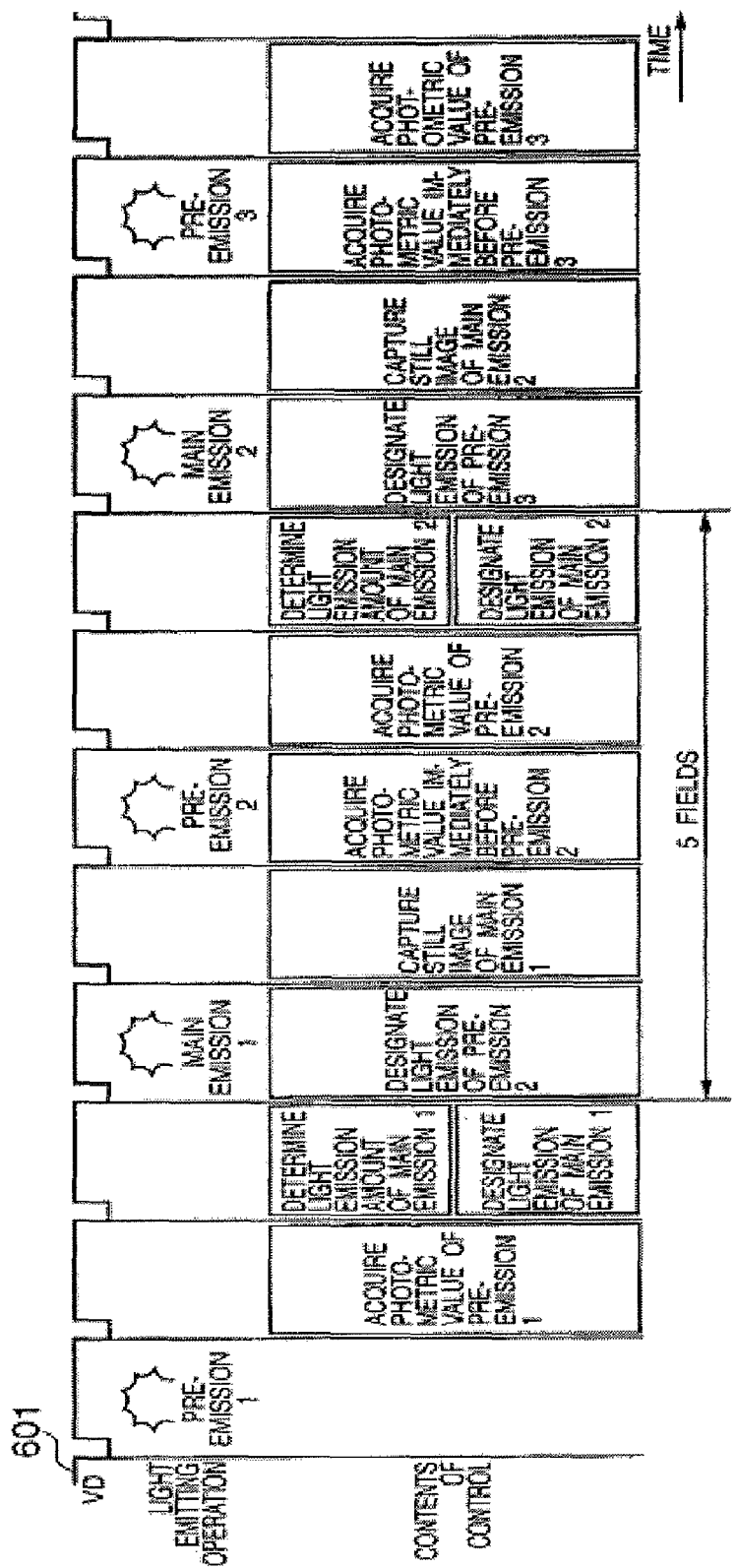
FIG. 6 is a timing chart of light emission control by prior art.

As described above, when the light emission of the flash device is to be controlled in synchronism with continuous photography by which a plurality of images are continuously captured at predetermined intervals, the light emission amount of main emission synchronized with the first still image photography is determined on the basis of a photometric value during preemission, and the light emission amount of main emission synchronized with the nth (n>1) still image photography is determined on the basis of a photometric value during the (n−1)th main emission and a photometric value before the (n−1)th main emission. In this manner, the time required for preemission can be made shorter than that in the prior art shown in FIG. 6.

Figure 8:
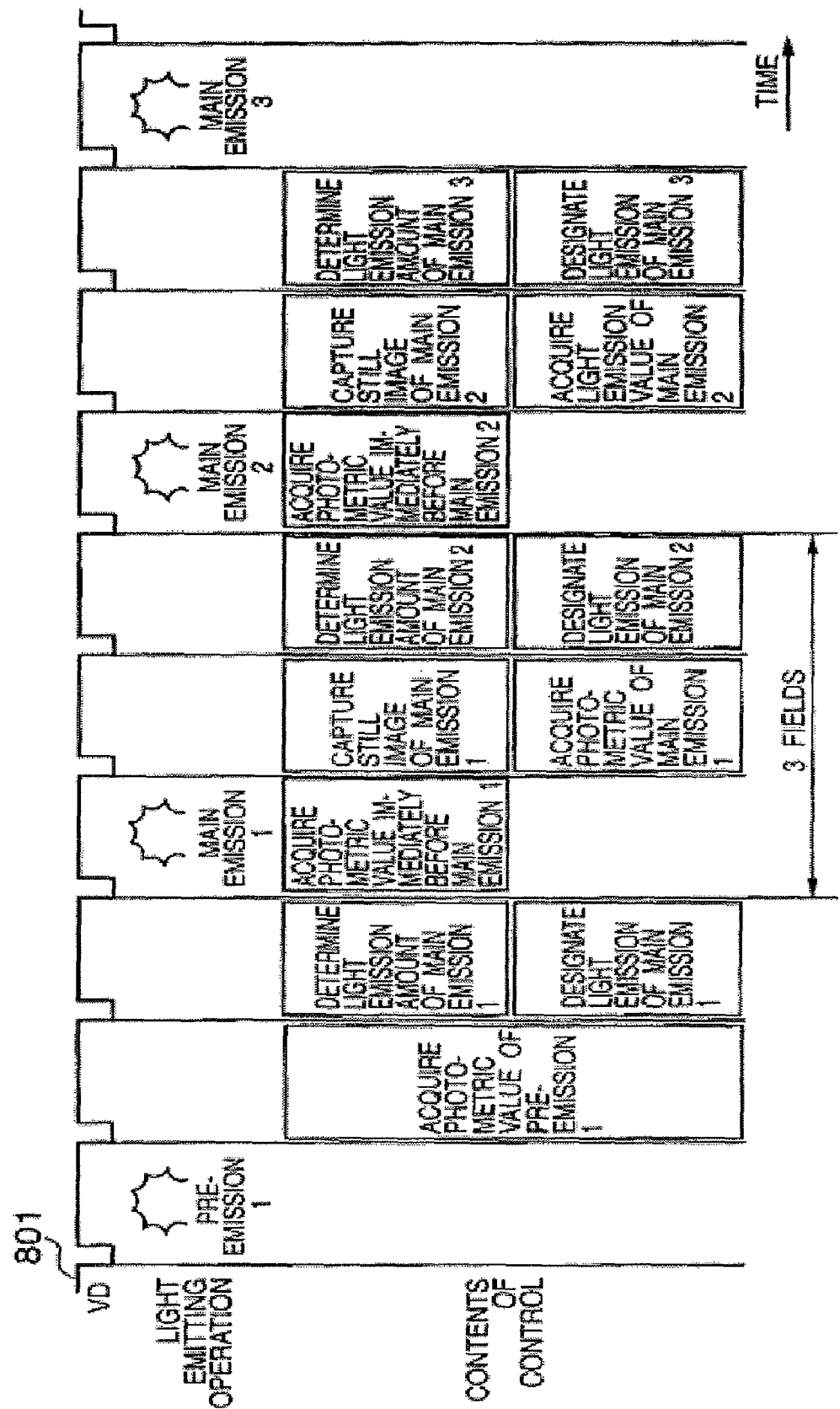
FIG. 8 is a timing chart of light emission control of the first embodiment according to the present invention.

In addition, as shown in FIG. 8, when a photometric value before main emission is read out in parallel with photography performed by main emission, it is possible to reduce the interval from arbitrary main emission to the next main emission, and synchronize the flash device with continuous photography in which the photographing interval is short.

Figure 7:
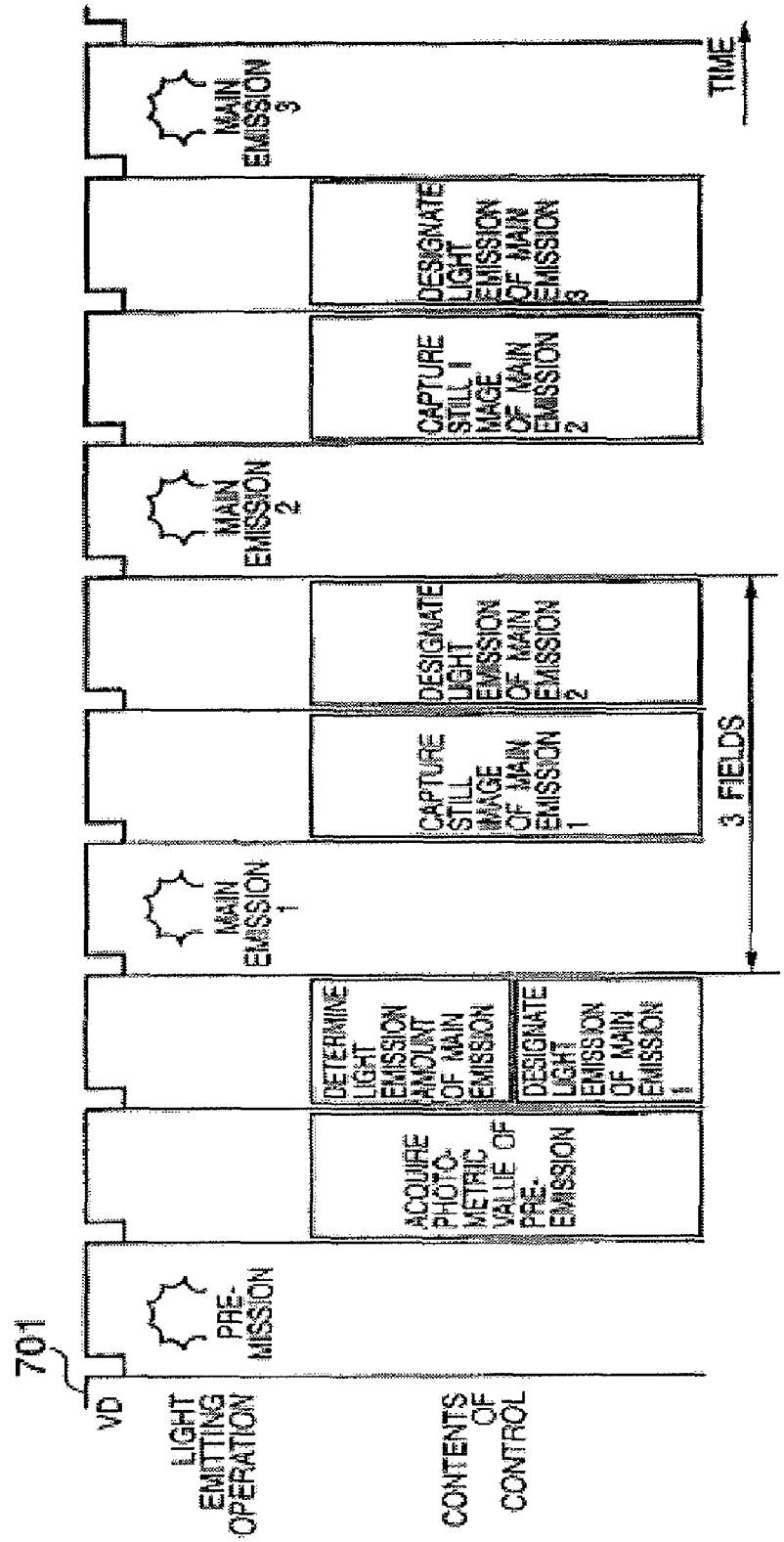
FIG. 7 is a timing chart of light emission control by prior art which shortens the light emission interval.

Furthermore, whenever a still image is photographed, the light emission amount is determined using the photometric value of immediately preceding main emission. Therefore, unlike in the prior art shown in FIG. 7, even if the exposure state changes during continuous photography because, e.g., an object has moved, an optimum light emission amount can be determined following this change. As a consequence, the exposure of each still image taken by continuous photography can always be correct.

In the first embodiment described above, when still images are to be continuously photographed at predetermined intervals and the light emitting operation of a flash device is to be synchronized with this continuous photography in a digital still camera which determines the light emission amount of the flash device by performing preemission, the light emission amount of main emission in the first still image photography is determined from a photometric value obtained by preemission. In the second still image photography and after that, the light emission amount of main emission is determined again from a photometric value obtained by immediately preceding main emission. Accordingly, the interval of continuous photography can be shortened, and correctly exposed images can always be obtained even for an object which changes its exposure state such as a moving object.

In the above embodiment, a photometric value is obtained from the output of an image sensor. However, it is also possible to separate this image sensor from a photometric device for obtaining a photometric value, and simultaneously process still image photography performed by the image sensor and photometry during main emission performed by the photometric device.

If, however, the image sensor and the photometric device for obtaining a photometric value are separated, a photometric value obtained by the photometric device must be converted by calculation into a value suited to the image sensor by taking account of the difference between the characteristics of the image sensor and photometric device. Therefore, a digital still camera must incorporate a ROM or RAM storing data as the basis of this calculation, and an additional A/D converter for converting the output from the photometric device into a digital value. A device for synchronizing the output timings of the photometric device and image sensor is also required.

Accordingly, to reduce the load of the system controller and simplify the internal circuits of the digital still camera, the image sensor is also given the photometric function of obtaining a photometric value.

[Second Embodiment]

The second embodiment according to the present invention is a flash device control method of a digital still camera having a multi-frame photographing function of continuously photographing a predetermined number of still images at predetermined intervals and recording these still images as a multi-frame, and capable of controlling a flash device to emit light in synchronism with this continuous photography.

Figure 5:
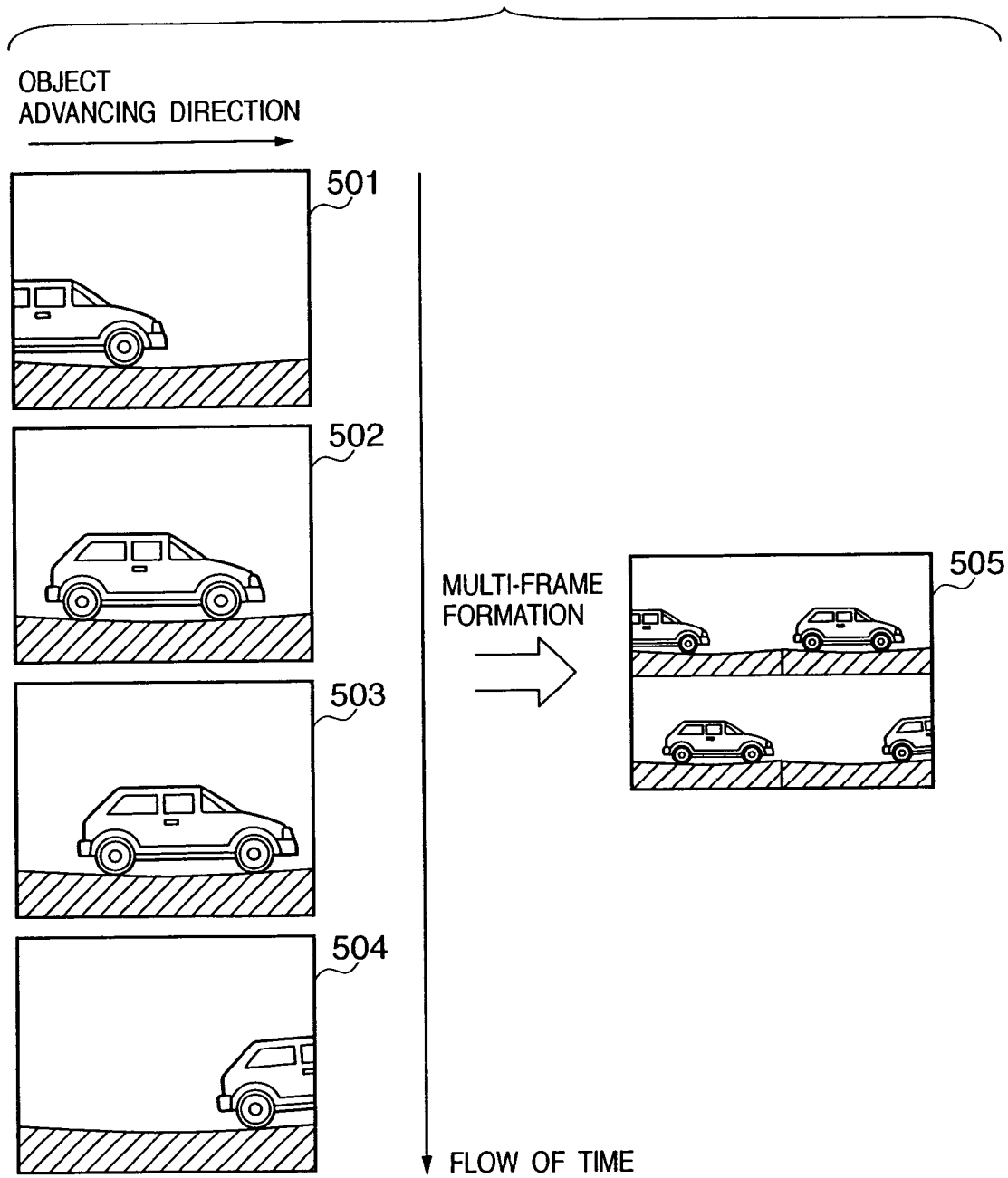
FIG. 5 is a view for explaining the multi-frame photographing function.

FIG. 5 explains the multi-frame photographing function. Reference numerals 501, 502, 503, and 504 denote still images photographed at predetermined intervals; and 505, the result of multi-frame photography of the still images 501, 502, 503, and 504.

Figure 4:
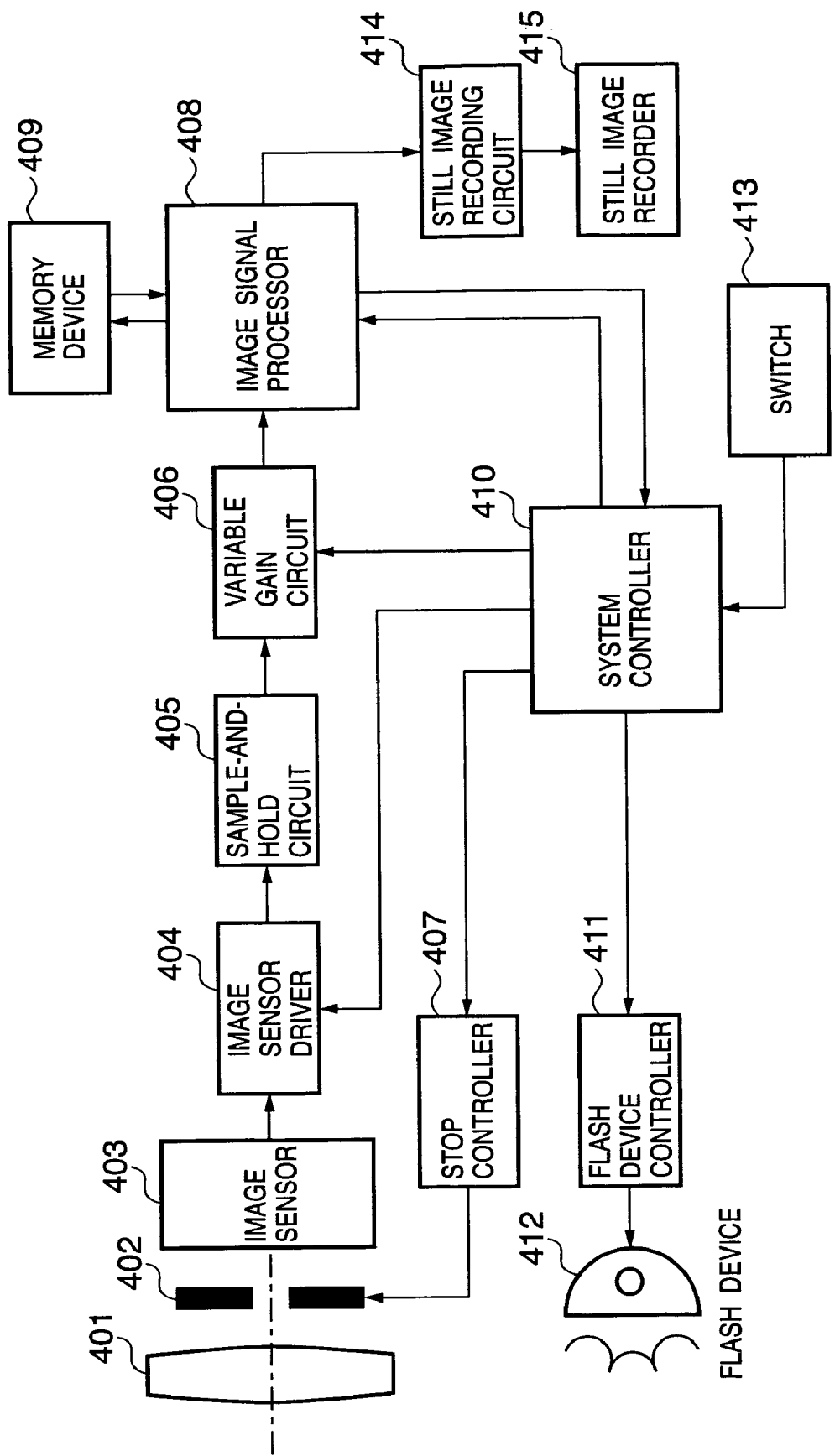
FIG. 4 is a functional block diagram of a digital still camera including a flash device, still image continuous photographing function, and multi-frame photographing function.

Control blocks of the digital camera including this multi-frame photographing function are the same as shown in FIG. 4. The functions of these blocks will be explained below in accordance with this embodiment.

A switch 413 also functions as a switch for executing multi-frame photography. When the switch 413 is operated, multi-frame photography/recording start request information is output to a system controller 410.

When the switch 413 is operated and the multi-frame photography start request information is obtained, an image signal processor 408 reduces the size of still images photographed at predetermined intervals, and stores these images in a memory device 409 by arranging them in a time-series manner. When photography of a predetermined number of still images is complete, the image signal processor 408 outputs, to a still image recording circuit 414, image signals of the multi-frame images stored in the memory device 409. The still image recording circuit 414 records these multi-frame images in a still image recorder 415.

Processing performed by the system controller when the flash device is to be controlled in synchronism with multi-frame photography in the second embodiment will be described below with reference to a flowchart shown in FIG. 2.

Figure 2:
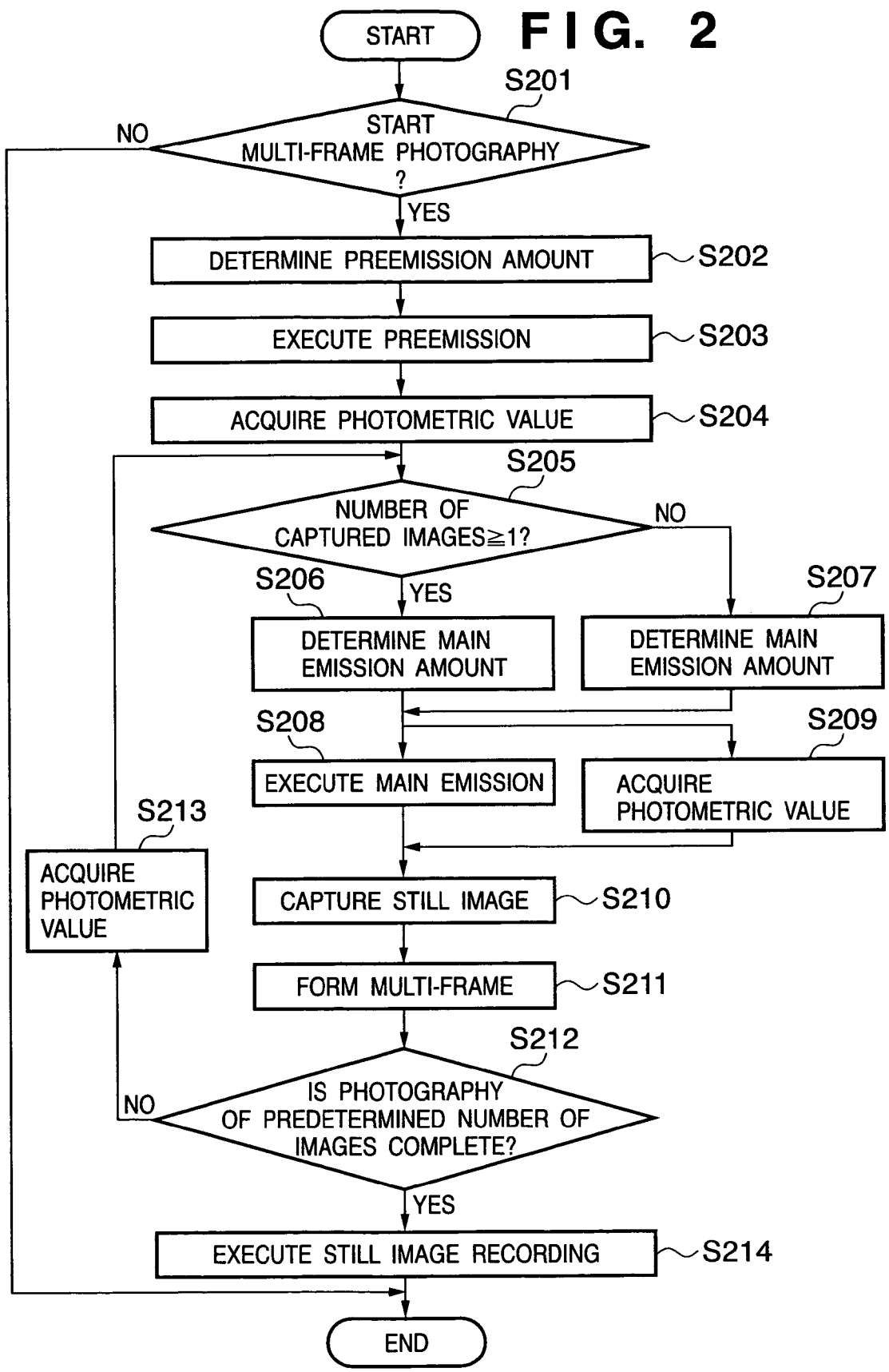
FIG. 2 is a flowchart showing flash device control of the second embodiment according to the present invention.
Figure 3:
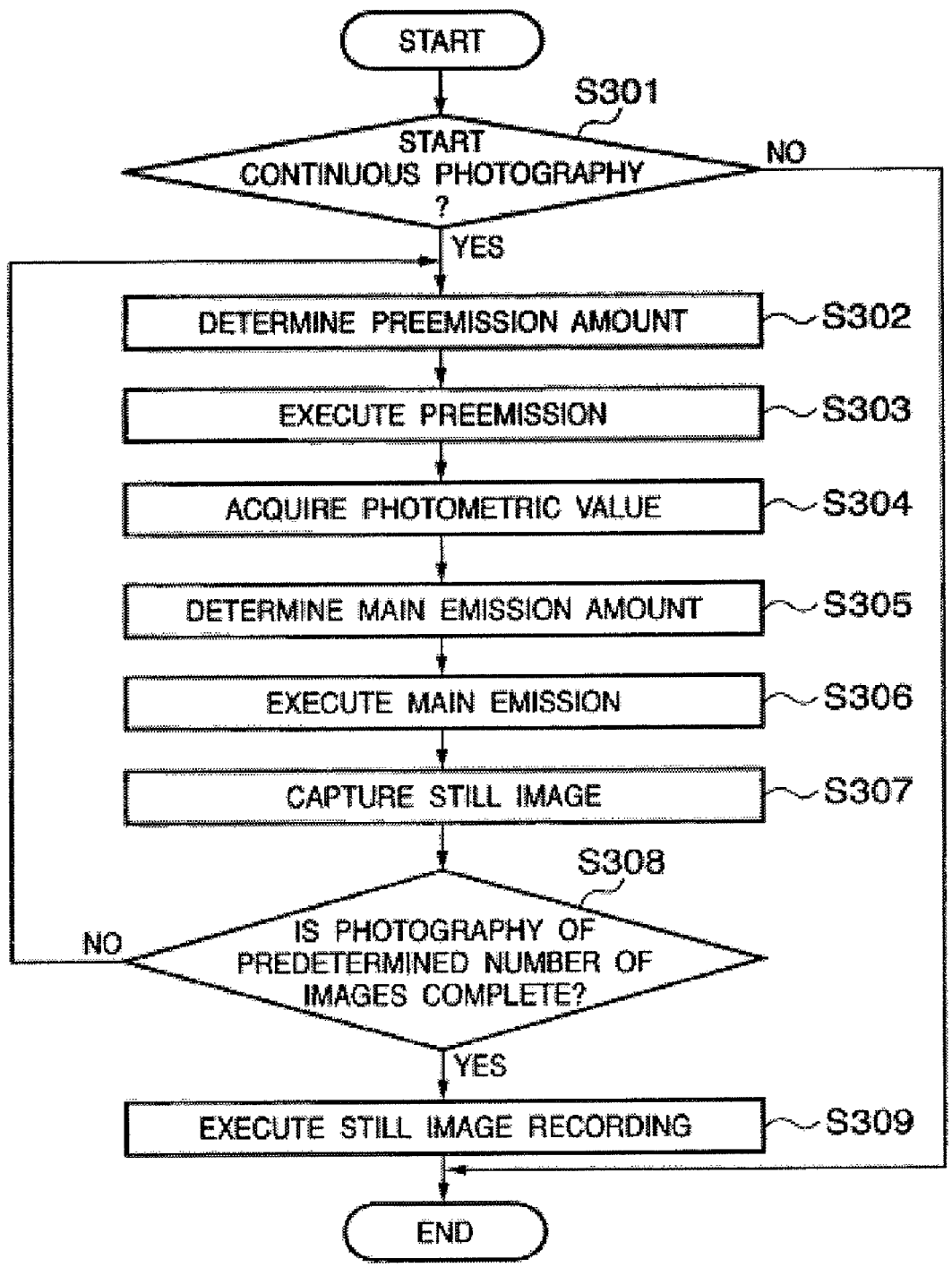
FIG. 3 is a flowchart showing flash device control according to prior art.

In step S201 of FIG. 2, the system controller 410 determines whether the multi-frame photography start switch 413 is operated to generate a multi-frame photography start request. If the request is generated, the flow advances to step S202.

In step S202, the system controller 410 initializes number-of-captured-image information indicating the number of captured still images, and acquires a photometric value before preemission. Then, the system controller 410 determines the light emission amount of preemission in accordance with the brightness of an object, and the flow advances to step S203.

In step S203, the system controller 410 outputs the light emission information of preemission to a flash device controller 411, and the flash device controller 411 controls a flash device 412 to perform preemission at a predetermined timing on the basis of the indicated light emission information. When the flash device 412 completes the preemission, the flow advances to step S204.

In step S204, the system controller 410 acquires a photometric value during the preemission from the image signal processor 408, and the flow advances to step S205.

In step S205, the system controller 410 determines from the number-of-captured-image information whether one or more still images forming a multi-frame are captured in advance. If one or more still images are captured, the flow advances to step S206; if not, the flow advances to step S207.

In step S206, from a photometric value before the last main emission acquired in step S209 and a photometric value during the last main emission acquired in step S213, the system controller 410 determines the light emission amount of main emission to be performed, such that a photometric value during this main emission has a predetermined level. After that, the flow advances to step S208.

In step S207, from the photometric value before the preemission and the photometric value during the preemission, the system controller 410 determines the light emission amount of main emission such that a photometric value during the main emission has a predetermined level. The flow then advances to steps S208 and S209.

In step S208, the system controller 410 outputs the light emission amount information of main emission to the flash device controller 411. The flash device controller 411 controls the flash device 412 to emit light in synchronism with capturing of a still image. When the flash device 412 completes main emission, the flow advances to step S210.

In step S209, the system controller 410 acquires, from the image signal processor 408, the photometric value of a still image which is read while the final light emission amount is determined in step S206 or S207, and the flow advances to step S210.

In step S210, the image signal processor 408 captures an image signal obtained at the timing synchronized with the main emission, and updates the number-of-captured-image information, and the flow advances to step S211.

In step S211, the system controller 410 instructs the image signal processor 408 to form the captured images into a multi-frame. The image signal processor 408 reduces the photographed still images, and determines the positions of these reduced still images so that they are arranged in a time-series manner, on the basis of the number-of-captured-image information with respect to total-number-of-photographed-still-image information of still images. When the still images are completely written in the memory device, the flow advances to step S212.

In step S212, the system controller 410 determines from the number-of-captured-image information whether the number of captured still images has reached a predetermined number of images of multi-frame photography. If NO in step S212, the flow advances to step S213. If YES in step S212, the flow advances to step S214.

In step S213, the system controller 410 acquires, from the image signal processor 408, the photometric value during main emission captured in step S209, and the flow advances to step S205.

In step S214, the system controller 410 instructs the image signal processor 408 to read out the still images stored in the memory device 409 and record them in the still image recorder 415.

As described above, when the light emission of the flash device 412 is to be controlled in synchronism with multi-frame photography, the light emission amount of main emission synchronized with the first still image photography is determined on the basis of a photometric value during pre-emission, and the light emission amount of main emission synchronized with the nth (n>1) still image photography is determined on the basis of a photometric value during the (n−1)th main emission and a photometric value before the (n−1)th main emission. In this manner, the time required for preemission can be shortened.

In addition, when a photometric value before main emission is read out in parallel with photography performed by main emission, it is possible to reduce the interval from arbitrary main emission to the next main emission, and synchronize the flash device 412 with multi-frame photography in which the photographing interval is short.

Furthermore, whenever a still image forming a multi-frame is photographed, the light emission amount is determined using the photometric value of main emission during immediately preceding image capturing. Therefore, even if the exposure state changes during image capturing because, e.g., an object has moved, an optimum light emission amount can be determined following this change. This allows multi-frame photography in which the exposure of each still image forming a multi-frame is always correct. If the brightness of an object abruptly changes in a moment by some accident and a still image is captured in this moment, the exposure of the next still image may not be correct any longer. To prevent this, it is also possible to determine the light emission amount of the nth (n>2) still image photography on the basis of photometric values during the (n−1)th and (n−2)th main emissions. With this arrangement, an abrupt exposure amount change can be prevented while the photometric value of main emission during immediately preceding image capturing is referred to.

In the second embodiment described above, when multi-frame photography is to be performed by capturing still images at predetermined intervals and the light emitting operation of a flash device is to be synchronized with this image capturing in a digital still camera which determines the light emission amount of the flash device by performing preemission, the light emission amount of main emission in the first still image capturing is determined from a photometric value obtained by preemission. In the second still image capturing and after that, the light emission amount of main emission is determined again from a photometric value obtained by immediately preceding main emission. Accordingly, the capturing intervals of still images can be shortened, and correctly exposed images can always be obtained even for an object which changes its exposure state such as a moving object.

The present invention is not limited to the above embodiment, and various changes and modifications can be made thereto within the spirit and scope of the present invention. Therefore, to apprise the public of the scope of the present invention, the following claims are made.

CLAIM OF PRIORITY

This application claims priority from Japanese Patent Application No. 2004-039802 filed Feb. 17, 2004, which is hereby incorporated by reference herein.

What is claimed is:

1. A control method of an image sensing apparatus which has a flash unit adapted to emit light in accordance with brightness of an object in a flash photography and can continuously capture a plurality of flash photographs in a single photographing operation, the control method comprising:
   (i) a photometry step of acquiring a photometric value of the object; and
   (ii) a control step of determining a light emission amount of the flash unit in the flash photography,
   wherein, when the plurality of flash photographs are continuously captured in the single photographing operation, said control step determines:
      (a) a light emission amount of a main emission of the flash unit in a first flash photograph based on a photometric value obtained during a pre-emission of the flash unit in the first flash photograph and a photometric value in a non-light emission of the flash unit prior to capturing the first flash photograph, and
      (b) a light emission amount of the main emission of the flash unit in a second flash photograph based on the photometric value in the main emission of the flash unit obtained during the first flash photograph and a photometric value in the non-light emission of the flash unit after capturing the first flash photograph and immediately prior to capturing the second flash photograph.

2. The method according to claim 1, wherein, when the plurality of flash photographs are continuously captured in the single photographing operation, said control step determines the light emission amount of the main emission of the flash unit in the second flash photograph and after that based on the photometric value in the main emission of the flash unit in the flash photograph once before that and the photometric value in the non-light emission of the flash unit in a period between the light emission of the flash unit just before the main emission in the flash photograph once before that and the main emission in the flash photograph once before that.

3. The method according to claim 1, wherein, when the plurality of flash photographs are continuously captured in the single photographing operation, said control step determines the light emission amount of the main emission of the flash unit in a third flash photograph and after that based on the photometric value in the main emission of the flash unit in the flash photograph once before that, the photometric value in the main emission of the flash unit in the flash photograph twice before that and the photometric value in the non-light emission of the flash unit in a period between the main emission of the flash unit in the flash photograph twice before that and the main emission of the flash unit in the flash photograph once before that.

4. An image sensing apparatus which can continuously capture a plurality of flash photographs in a single photographing operation, the apparatus comprising:
   (i) a photometry unit adapted to acquire a photometric value of an object;
   (ii) a flash unit adapted to emit light in accordance with brightness of the object in a flash photography; and
   (iii) a control unit adapted to determine a light emission amount of the flash unit in the flash photography,
   wherein, when the plurality of flash photographs are continuously captured in the single photographing operation, said control unit determines:
      (a) a light emission amount of a main emission of the flash unit in a first flash photograph based on a photometric value obtained during a pre-emission of the flash unit in the first flash photograph and a photometric value in a non-light emission of the flash unit prior to capturing the first flash photograph, and (b) a light emission amount of the main emission of the flash unit in a second flash photograph based on the photometric value in the main emission of the flash unit obtained during the first flash photograph and a photometric value in the non-light emission of the flash unit after capturing the first flash photograph and immediately prior to capturing the second flash photograph.

5. The apparatus according to claim 4, wherein, when the plurality of flash photographs are continuously captured in the single photographing operation, said control unit determines the light emission amount of the main emission of the flash unit in the second flash photograph and after that based on the photometric value in the main emission of the flash unit in the flash photograph once before that and the photometric value in the non-light emission of the flash unit in a period between the emission of the flash unit just before the main emission in the flash photograph once before that and the main emission in the flash photograph once before that.

6. The apparatus according to claim 4, wherein, when the plurality of flash photographs are continuously captured in the single photographing operation, said control unit determines the light emission amount of the main emission of the flash unit in a third flash photograph and after that based on the photometric value in the main emission of the flash unit in the flash photograph once before that, the photometric value in the main emission of the flash unit in the flash photograph twice before that and the photometric value in the non-light emission of the flash unit in a period between the main emission of the flash unit in the flash photograph twice before that and the main emission of the flash unit in the flash photograph once before that.

* * * * *